United States Patent [19]

Glatzmaier

[11] Patent Number: 5,128,115
[45] Date of Patent: Jul. 7, 1992

[54] MANUFACTURE OF SILICON CARBIDE USING SOLAR ENERGY

[75] Inventor: Gregory C. Glatzmaier, Boulder, Colo.

[73] Assignee: The United States of America as represented by the United States Department of Energy, Washington, D.C.

[21] Appl. No.: 681,296

[22] Filed: Apr. 8, 1991

[51] Int. Cl.⁵ .............................. C01B 31/36
[52] U.S. Cl. ..................... 423/345; 423/344; 23/295 S
[58] Field of Search .............. 423/344, 345, 346; 23/295 S; 501/88

[56] References Cited

U.S. PATENT DOCUMENTS

| | | | |
|---|---|---|---|
| 2,987,961 | 6/1961 | Cotton et al. | 359/853 |
| 4,162,167 | 7/1979 | Enomoto et al. | 106/44 |
| 4,419,336 | 12/1983 | Kuriskose | 423/345 |
| 4,534,948 | 8/1985 | Baney | 423/345 |
| 4,702,900 | 10/1987 | Kurachi et al. | 423/345 |
| 4,789,536 | 12/1988 | Schramm et al. | 423/345 |
| 4,904,622 | 2/1990 | Dubots et al. | 501/88 |
| 4,915,924 | 4/1990 | Nadkarni et al. | 423/345 |
| 5,021,230 | 6/1991 | Krstic | 423/345 |

Primary Examiner—Robert Kunemund
Assistant Examiner—Ken Horton
Attorney, Agent, or Firm—Kenneth Richardson; James W. Weinberger; William R. Moser

[57] ABSTRACT

A method is described for producing silicon carbide particles using solar energy. The method is efficient and avoids the need for use of electrical energy to heat the reactants. Finely divided silica and carbon are admixed and placed in a solar-heated reaction chamber for a time sufficient to cause a reaction between the ingredients to form silicon carbide of very small particle size. No grinding of silicon carbide is required to obtain small particles. The method may be carried out as a batch process or as a continuous process.

14 Claims, 2 Drawing Sheets

MANUFACTURE OF SILICON CARBIDE USING SOLAR ENERGY

CONTRACTUAL ORIGIN OF THE INVENTION

The United States Government has rights in this invention under Contract No. DE-AC02-83CH10093 between the United States Department of Energy and the Solar Energy Research Institute, a Division of the Midwest Research Institute.

BACKGROUND OF THE INVENTION

1. Field of the Invention

The present invention relates, generally, to methods for producing silicon carbide and, more particularly to methods for producing silicon carbide particles using solar thermal energy. Specifically, the present invention relates to improved methods which are more efficient than previously available for producing silicon carbide particles.

2. Description of the Prior Art

Silicon carbide is an abrasive material which is widely used in a variety of grinding and polishing applications. Its hardness is 9.5 on the Mohs scale and therefore is only slightly less than the hardness of diamond (which is 10 on the same scale).

Silicon carbide is made by reacting silica with carbon at 1800-1900° C. The chemical reaction for the process is:

$$SiO_2 + 3C \rightarrow SiC + 2CO$$

Silicon carbide was first made by this reaction in 1891 in an electric arc furnace. At that time the silicon carbide was used by jewelers as a polishing agent. Today silicon carbide powders are produced in various grades. The differences between the high and low grades are purity and particle size. Low grade silicon carbide consists of relatively low purity (less than 98%) particles having a diameter of 0.1-10 millimeters. High grade silicon carbide consists of high purity particles (greater than 98%) having a diameter of 0.5 to 5 microns. Low grade silicon carbide is widely used as an abrasive in polishing and grinding wheels.

Because of its high melting point (2200° C.), it is also used as refractory in high temperature furnaces. High grade silicon carbide is also sintered to make various types of components, such as fittings, feed throughs, etc. for high temperature applications. Worldwide production of silicon carbide is about 200,000 tons per year.

Conventional manufacturing methods for producing silicon carbide utilize electric-resistance furnaces to provide the thermal energy which is necessary to produce the material. Such methods use a significant amount of energy.

The conventional electric resistance furnace typically consists of a bed (10 feet by 10 feet by 30 feet) of well mixed silica and carbon particles. Two solid carbon electrodes extend into the bed at both ends. The electrodes are connected with a core of pure carbon particles which carry the electrical current when the reaction is initiated. The bed is heated with electricity for a period of 8 hours or more during which the process continuously draws 6000 amps of current at 230 volts. The reaction between the silica and carbon is virtually instantaneous once 1800° C. is reached. Heat transfer limitations within the bed require the long period of heating to allow the large mass of material to reach 1800° C. The heating period is followed by a cooling period of 20 hours. The bed produces silicon carbide ingots that range in size from 1 foot in diameter down to diameters of approximately 100 microns. The reacted material is manually fed to a crusher to reduce the size of the ingots to small particles. The particles are then chemically treated with acid to remove unreacted silica along with contaminants from the crushing process. Excess carbon is removed by oxidation at temperatures less than 500° C. The particles are then screened and classified according to particle size and shape.

The costs associated with handling large quantities of electricity, and the costs associated with crushing the silicon carbide to smaller particles, account for the major costs in producing the material using conventional techniques.

U.S. Pat. No. 4,419,336 (Kuriakose) describes an improved electric resistance furnace for producing silicon carbide. U.S. Pat. No. 4,534,948 (Baney) describes a process for producing silicon carbide using specific polysilane polymers as starting materials. The polymer is heated to 1600° C. in an inert atmosphere to form silicon carbide. The main advantage of this approach is that the polymer can be pre-formed into fibers or other shapes which the silicon carbide assumes when it forms. These patents do not describe a process for forming silicon carbide using a solar furnace.

U.S. Pat. No. 2,987,961 (Cotton et al.) describes a solar furnace and improved concentrator for focusing solar rays. There is no suggestion in such patent of a process for forming silicon carbide.

SUMMARY OF THE INVENTION

It is an object of the invention to provide an improved method for producing silicon carbide which is highly energy efficient.

It is another object of the invention to provide a method for producing silicon carbide which avoids the need for using electrical energy.

It is yet another object of the invention to provide an improved method for producing silicon carbide having very small particle size in a one-step process.

It is still another object of this invention to provide an improved method for producing silicon carbide particles of small size without need for crushing the material after production.

It is yet another object of this invention to provide an improved method for producing silicon carbide particles in a continuous process utilizing solar energy.

Additional objects, advantages, and novel features of the invention shall be set forth in part in the description that follows and in part will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects and in accordance with the purpose of the present invention, as embodied and broadly described herein, the improved methods may comprise mixing finely divided silica and carbon particles, exposing the particles to a thermal zone of high solar flux in a manner and for a time sufficient to thermally react the silica and the carbon.

The process of the invention can be carried out in a batch manner or in a continuous manner. The particles of silicon carbide produced in accordance with this invention have small particle size and are therefore very desirable commercially. The particles may range in size from about 0.5 to 70 microns (preferably 0.5 to 15 microns, and more preferably 0.5 to 1 micron).

Because the process of this invention utilizes solar energy to heat the reactants, the process avoids the need for use of a conventional electrical resistance furnace. The desired particle composition and size are formed at high temperature in a one-step process. Therefore, the crushing step is eliminated. Accordingly, the process of this invention is very efficient.

BRIEF DESCRIPTION OF THE DRAWINGS

The accompanying drawings, which are incorporated in and form a part of the specification, illustrate the preferred embodiments of the present invention and, with the description, explain the principles of the invention.

DETAILED DESCRIPTION OF THE PREFERRED EMBODIMENTS

Figure 1:
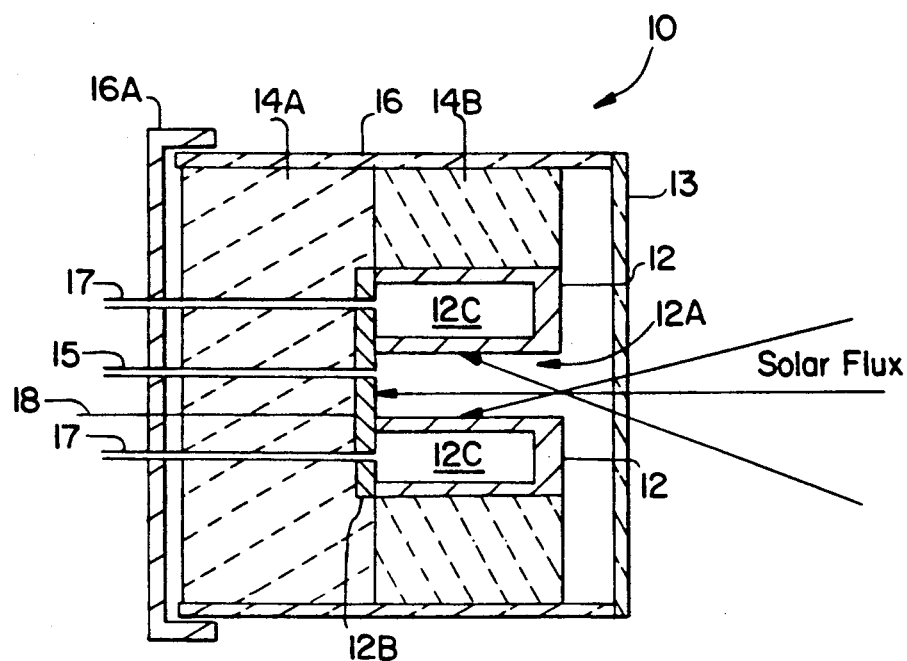
FIG. 1 is a cross-sectional view illustrating one embodiment of reactor assembly which is useful in this invention.

FIG. 1 illustrates a preferred reactor assembly 10 which is useful in a batch process for producing silicon carbide particles in accordance with this invention. This solar-heated reaction chamber comprises an annular graphite core 12 having a central cavity 12A therein. The open end of the cavity is covered with a quartz window 13. The graphite core is surrounded by high temperature ceramic insulation sections 14 and 14B which are in turn enclosed in a quartz shell 16.

The graphite core 12 includes a hollow annulus or ring-shaped compartment 12C where the reactants are placed in order to be heated to the desired reaction temperature. Access to compartment 12C is obtained by removing cover 16A, tubes 15 and 17, and the thermocouple 18. Then insulation section 14A is removed, after which cover member 12B can be removed. This allows access to the compartment 12C for placing reactants therein (or for removing silicon carbide particles at the conclusion of the process).

The cavity 12A can be purged with an inert gas such as nitrogen through line or tube 15. Carbon monoxide produced during the process is vented from the compartment 12C through lines or tubes 17. Thermocouple 18 enables the temperature in the graphite core to be monitored.

Solar energy from a plurality of mirrors or reflectors is focused at the open end of the cavity, as illustrated. In this manner the graphite absorbs the solar energy and becomes heated, preferably to a temperature in the range of about 1750° C. to 1900° C. Preferably the solar flux is about 160 to 190 W/cm².

The silica used as a starting material is finely divided. Preferably it has a particle size less than about 100 microns. Even more preferably the particle size is less than about 10 microns. Most preferably the particle size is about 1 micron.

The carbon particles preferably have a particle size less than about 10 microns. Even more preferably the size is about 1 micron.

The silica and carbon particles are admixed and then placed in the compartment 12C of the solar-heated reaction chamber. Preferably the silica is about 60% by weight of the admixture and the carbon is about 40% by weight. This ratio of silica to carbon is preferred because it represents an excess of about 10%–15% carbon. The residence time of the admixture in the reaction compartment is less than about 10 minutes.

The silicon carbide particles produced in the method of this invention have very small particle size. Preferably they have a size less than about 15 microns. Even more preferably they have a size less than about 1 micron. No grinding is required.

Figure 2:
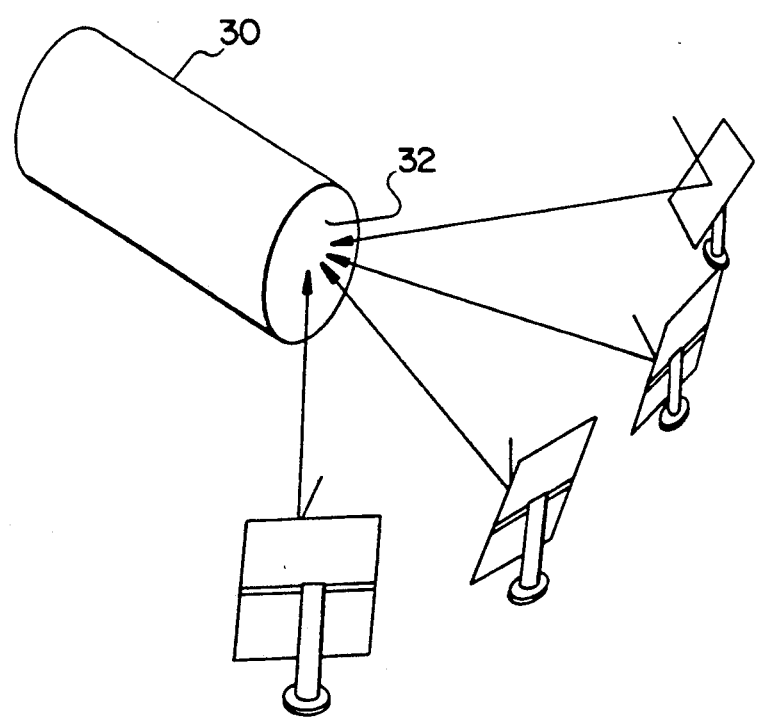
FIG. 2 is a perspective view illustrating another embodiment of apparatus which is useful in this invention.

FIG. 2 illustrates on manner in which sunlight may be reflected and focused on the end of a cavity in a solar-heated reaction chamber. Thus, there are shown a plurality of reflectors 20 which are positioned such that they each reflect solar rays into a cavity in a graphite core (of the type shown in FIG. 1, for example) behind window 32 in solar heated reaction chamber 30. The number and size of such reflectors and the size of the reaction chamber may vary, as desired. Reflectors of this type are well known in the art.

Figure 3:
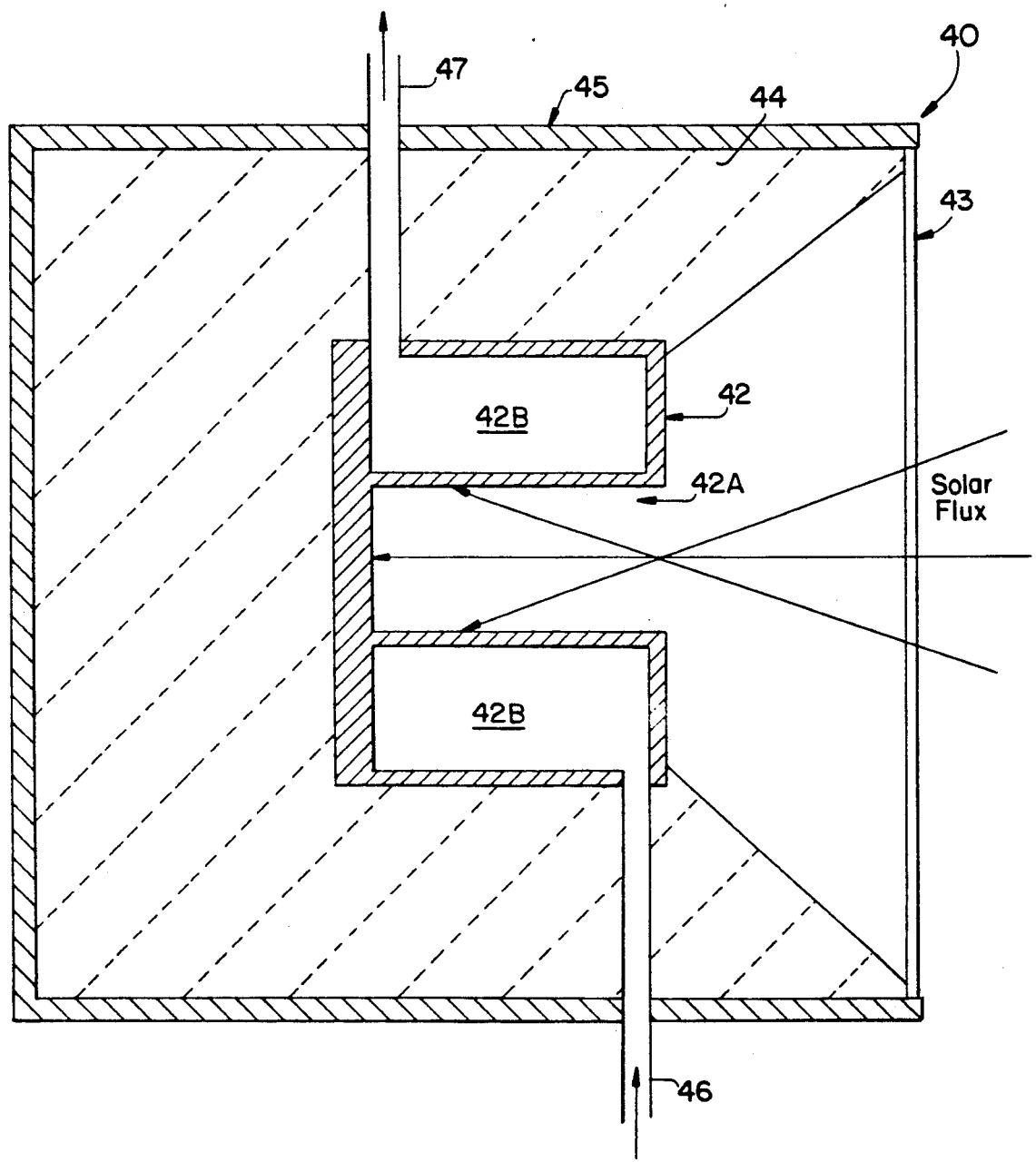
FIG. 3 is a cross-sectional view of a reactor assembly useful in a continuous process in accordance with this invention.

FIG. 3 illustrates another type of solar-heated reaction chamber 40 which is useful in the practice of this invention. This apparatus is useful in a continuous process for the production of silicon carbide using the techniques of this invention. The apparatus includes a graphite core 42 including a cavity 42A therein. The core 42 includes a hollow annulus or reaction compartment 42B.

Surrounding the graphite core is high temperature ceramic insulation 44. A stainless steel shell 45 surrounds the insulation, and a quartz window 43 is positioned at one end of the chamber, as illustrated, so that solar energy can pass through it and into cavity 42A. Preferably the solar rays are focused at the open end of the cavity. The rays diverge as they enter into the cavity where they are then absorbed by the walls of the graphite core.

The silica and carbon particles to be reacted are mixed and entrained in an inert gas (nitrogen or helium) and passed into the hollow annulus compartment 42B through conduit 46. The flow rate is such that the particles become heated to the desired reaction temperature in the compartment 42B to form silicon carbide and carbon monoxide. The end products exit compartment 42B through exit conduit 47. Normally, the reactants need only be in the compartment 42B for about 10 seconds for proper reaction to take place to form silicon carbide. No grinding of the resulting product is required.

The foregoing is considered as illustrative only of the principles of the invention. Further, because numerous modifications and changes will readily occur to those skilled in the art, it is not desired to limit the invention to the exact construction and operation shown and described. Accordingly, all suitable modifications and equivalents may be resorted to falling within the scope of the invention as defined by the claims which follow.

The embodiments of the invention in which an exclusive property or privilege is claimed are defined as follows:

1. A method for producing silicon carbide particles comprising the steps of:

(a) providing finely divided silica; wherein said silica has a particle size less than about 100 microns;

(b) providing finely divided carbon; wherein said carbon has a particle size less than about 10 microns;

(c) admixing said particles of silica and carbon to form an admixture;

(d) providing a thermal zone heated by means of solar energy; wherein said thermal zone comprises a reaction compartment in a graphite core; wherein said graphite core includes a cavity having an end which is covered by a quartz window; wherein said solar energy is directed through said window; and (e) placing said admixture in said thermal zone for a time sufficient to cause said silica and carbon to react to form silicon carbide.

2. A method in accordance with claim 1, wherein said thermal zone is at a temperature in the range of about 1750° C. to 1900° C.

3. A method in accordance with claim 1, wherein said silica comprises about 60% of the weight of said admixture and said carbon comprises about 40% of the weight of said admixture.

4. A method in accordance with claim 1, wherein said silica and said carbon each have a particle size of about 1 micron.

5. A method in accordance with claim 1, wherein said reaction compartment comprises a batch reactor.

6. A method in accordance with claim 1, wherein said reaction compartment comprises a hollow annulus in said graphite core, and wherein said graphite core is surrounded on three sides by thermal insulation.

7. A method in accordance with claim 6, wherein said reaction compartment includes an inlet and an outlet, and wherein said silica and carbon particles are entrained in an inert gas stream and fed to said reaction compartment through said inlet.

8. A method in accordance with claim 1, wherein said admixture is placed in said reaction compartment for a time less than about 10 minutes.

9. A method in accordance with claim 7, wherein said admixture has a residence time in said reaction compartment off less than about 10 seconds.

10. A method for producing silicon carbide particles comprising the steps of:
(a) providing finely divided silica; wherein said silica has a particle size less than about 100 microns;
providing finely divided particles of carbon; wherein said carbon has a particle size less than about 10 microns;
(c) admixing said particles of silica and carbon to form an admixture;
(d) providing a solar-heated reaction chamber comprising an annular graphite core including a reaction compartment comprising a hollow annulus in said core; wherein said graphite core is surrounded on three sides by thermal insulation, and wherein said graphite core further includes a cavity having an end which is covered by a quartz window; wherein said graphite core is heated to a temperature in the range of about 1750° C. to 1900° C. by solar energy directed through said window;
(e) placing said admixture in said reaction compartment for a time sufficient to cause said silica and carbon to react to form silicon carbide.

11. A method in accordance with claim 10, wherein said silica comprises about 60% of the weight of said admixture and said carbon comprises about 40% of the weight of said admixture.

12. A method in accordance with claim 10, wherein said silica and said carbon each have a particle size of about 1 micron.

13. A method in accordance with claim 10, wherein said solar-heated reaction chamber comprises a batch reactor.

14. A method in accordance with claim 10, wherein said reaction compartment includes an inlet and an outlet, wherein said silica and carbon particles are entrained in an inert gas stream and fed to said reaction compartment through said inlet, and wherein silicon carbide particles exit said reaction compartment through said outlet.

* * * * *